US008199720B2

(12) United States Patent
Hahn et al.

(10) Patent No.: US 8,199,720 B2
(45) Date of Patent: Jun. 12, 2012

(54) METHOD FOR HANDOVER BETWEEN HETEROGENOUS RADIO ACCESS NETWORKS

(75) Inventors: Gene Beck Hahn, Anyang-si (KR); Ae Ran Youn, Anyang-si (KR); Sung Woong Ha, Anyang-si (KR); Gi Won Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 304 days.

(21) Appl. No.: 12/451,379

(22) PCT Filed: Oct. 15, 2008

(86) PCT No.: PCT/KR2008/006074
§ 371 (c)(1),
(2), (4) Date: Nov. 10, 2009

(87) PCT Pub. No.: WO2009/051400
PCT Pub. Date: Apr. 23, 2009

(65) Prior Publication Data
US 2010/0091733 A1    Apr. 15, 2010

Related U.S. Application Data

(60) Provisional application No. 60/980,458, filed on Oct. 17, 2007.

(30) Foreign Application Priority Data

Dec. 28, 2007  (KR) .......................... 10-2007-0139698
May 1, 2008    (KR) .......................... 10-2008-0041049

(51) Int. Cl.
*H04W 4/00* (2009.01)

(52) U.S. Cl. ...................................... 370/331; 455/436
(58) Field of Classification Search ...................... None
See application file for complete search history.

(56) References Cited

U.S. PATENT DOCUMENTS

| 7,089,009 | B1 | 8/2006 | Fauconnier | |
|---|---|---|---|---|
| 7,668,147 | B2 * | 2/2010 | Lindsay et al. | 370/346 |
| 2002/0131386 | A1 * | 9/2002 | Gwon | 370/338 |

(Continued)

FOREIGN PATENT DOCUMENTS

KR    10-0739888    7/2007

(Continued)

OTHER PUBLICATIONS

Gehlen et al., "Architecture of a Vehicle Communication Gateway for Media Independent Handover", In Proc. of the 3$^{rd}$ International Workshop on Intelligent Transportation, Mar. 2006, pp. 205-209.

(Continued)

*Primary Examiner* — Steven H Nguyen
(74) *Attorney, Agent, or Firm* — McKenna Long & Aldridge LLP

(57) ABSTRACT

A method for handover between heterogeneous radio access networks is disclosed. When a multi-mode mobile station performs Inter-RAT handover, pre-authentication is performed before implementing a link layer handover procedure with a target access point. The pre-authentication method has as little an effect on currently served quality of service as possible and the handover is efficiently performed using the pre-authentication method. The pre-authentication is performed through medium independent handover (MIH) and various MIH primitives for pre-authentication are provided.

8 Claims, 6 Drawing Sheets

U.S. PATENT DOCUMENTS

| | | | |
|---|---|---|---|
| 2003/0193910 A1* | 10/2003 | Shoaib et al. | 370/331 |
| 2005/0255847 A1* | 11/2005 | Han et al. | 455/436 |
| 2006/0146803 A1* | 7/2006 | Bae et al. | 370/338 |
| 2006/0176852 A1* | 8/2006 | Wu et al. | 370/331 |
| 2006/0187858 A1* | 8/2006 | Kenichi et al. | 370/254 |
| 2008/0268844 A1* | 10/2008 | Ma et al. | 455/436 |
| 2009/0010222 A1* | 1/2009 | Jechoux | 370/331 |
| 2009/0017825 A1* | 1/2009 | Guillouard et al. | 455/440 |

FOREIGN PATENT DOCUMENTS

| | | |
|---|---|---|
| WO | WO 2006/083039 A1 | 8/2006 |
| WO | WO 2007/007914 A2 | 1/2007 |

OTHER PUBLICATIONS

Subir Das, Marc Meylemans: "Technical Requirements document for MIH Security", Sep. 27, 2007, pp. 1-11, IEEE 802.21 Session #23, XP002615554.

Subir Das, Marc Meylemans, Shubhranshu Singh, Ajay Rajkumar: "An Architecture for Security Optimization During Handovers", IEEE 802.21 session #22, Hawaii, Sep. 2007, pp. 1-9, XP002615551.

Dutta Telcordia V Fajardo (ED) R Lopez Y Ohba K Taniuchi Tari H Schulzrinne Columbia Univ A: Media-Independent Pre-Authentication (MPA) Implementation Results; Jul. 8, 2007, pp. 1-33, XP015052060.

* cited by examiner

METHOD FOR HANDOVER BETWEEN HETEROGENOUS RADIO ACCESS NETWORKS

This application claims the benefit of PCT/KR2008/006074, filed on Oct. 15, 2008, along with U.S. provisional application Ser. No. 60/980,458, filed Oct. 17, 2007, Korean Patent Application No. 10-2007-0139698, filed Dec. 28, 2007, and Korean Patent Application No. 10-2008-0041049, filed May 1, 2008, all of which are hereby incorporated herein by reference for all purposes in their entireties.

TECHNICAL FIELD

The present invention relates to a method for handover between heterogeneous radio access networks, and more particularly, to a method for efficiently performing handover between heterogeneous radio access networks using a pre-authentication procedure.

BACKGROUND ART

When a communicating mobile station moves from one radio access network to another radio access network such that an access point is changed, continuity of a service may be damaged due to a handover operation. A change of an access point refers to a change of an administrative domain or a change of a subnet. Especially, handover between heterogeneous radio access networks entails a new authentication procedure. A delay generated by performing the authentication procedure retards termination of the handover procedure, and as a result affects a currently served multimedia session.

Meanwhile, in the institute of electrical and electronics engineers (IEEE) 802.21 standard, handover between heterogeneous networks is actively being discussed. A range of the IEEE 802.21 standard for media independent handover (MIH) is to provide intelligence to a link layer and to establish a standard for transmitting related network information for optimal handover to a higher layer. This includes wired and wireless networks of IEEE 802-series (referred also to as "802-series" for simplicity), as well as a link specified by the $3^{rd}$ generation partnership project (3GPP)/3GPP2. Namely, the IEEE 802.21 standard has a purpose of improving user convenience by supporting handover between heterogeneous networks (referred also to as "Inter-RAT handover" for simplicity) and supports cooperative use of available information in a mobile terminal and a network. To this end, an access point of a network, such as a mobile terminal or a base station, should provide multi-mode operation, which means that multiple radio standards are supported and simultaneous connection over one or more radio interfaces is allowed.

An MIH function defined by the IEEE 802.21 standard serves to determine handover as a logical entity. The MIH function is located in both a mobile terminal and a network and enables the mobile station and the network to exchange information about setting or status of an access network in the vicinity of the mobile terminal. The MIH function may be referred to as "MIH entity" in order to discriminate between other entities performing other functions.

FIG. 1 illustrates a protocol layer configuration of a mobile terminal, an 802-series network, and a 3GPP/3GPP2 network.

A multi-mode mobile node 101 may include interfaces according to communication modes. FIG. 1 shows the mobile node 101 including a 3GPP/3GPP2 interface 104 and an 802-series interface 105. Such interfaces are divided into a physical (PHY) layer and a medium access control (MAC) layer. In FIG. 1, an 802-series network 102 and a 3GPP/3GPP2 network 103 include interfaces 106 and 107, respectively.

Meanwhile, MIH layers represented as MIH functions 108, 109, and 110 are located under a higher layer including an Internet protocol (IP) layer. The MIH layers define not only handover between 802-series interfaces but also handover between an IEEE 802-series interface and an interface defined by the 3GPP/3GPP2. Namely, the MIH function easily executes a handover process between heterogeneous networks by acquiring information about other networks from a layer 2 (for example, a MAC layer).

FIG. 1 illustrates higher layer functions 111, 112, and 113 of the mobile node 101, the 802-series network 102, and the 3GPP/3GPP2 network 103. The higher layer functions 111, 112, and 113 may be referred to as MIH users or MIH user entities in terms of MIH.

FIG. 2 illustrates a handover procedure between heterogeneous radio access networks by an MIH-based multi-mode mobile terminal.

In FIG. 2, a multi-mode mobile terminal 201 of a current access network performs handover to a network Y of a target network while being served by a network X 202. It is assumed in the mobile terminal 201 that a MAC1 201c and a MAC2 201d are entities which perform layer-2 communication with the network X 202 and the network Y 203, respectively.

The multi-mode mobile terminal 201 which is communicating while maintaining connection with the network X 202 acquires information about a neighbor network (for example, the network Y 203) from the network X 202 (step S201). In this case, information related to layer-2 security, such as an authentication method and an encryption algorithm, can be acquired through an information service defined in the MIH function. The mobile terminal 201 receives signals from the neighbor network through scanning and carries out a network detection and selection procedure (step S202).

Meanwhile, if a signal level received from the serving network X 202 is lower than a prescribed level, the interface MAC1 201c reports this to an MIH 201b of a higher layer through a local event trigger and to an MIH 202b of the network X 202 through a remote event trigger (step S203). The MIH 202b of the network X 202 requests an MIH 203b of the network Y 203 to be handed over to transmit IP information (step S204). The network Y 203 receiving the IP information request transmits the IP information to the mobile terminal 201 through the network X 202 (step S205). The mobile terminal 201 receiving the IP information of the network Y 203 can previously acquire an IP address which is to be used during handover to a corresponding network.

For handover to the network Y 203, the MIH 201b of the mobile terminal 201 commands that a MAC (i.e., MAC2 201d) of a corresponding interface perform a procedure for layer-2 handover (step S206). Then the mobile terminal 201 performs the layer-2 handover procedure to the network Y 203 by implementing a network initial registration procedure including the authentication and security related procedure (steps S207 and S208).

If the mobile terminal 201 completes the layer-2 handover (network registration procedure) with the network Y 203, the MAC2 201d of the mobile terminal 201 reports this to a higher layer 201a for layer-3 handover (step S209). The mobile terminal 201 performs the layer-3 handover including a procedure for registering care-of-address (CoA) acquired from a new network (network Y 203) to a home agent. If the handover is completed, the mobile terminal 201 initiates communication with a new network (step S210). Next, the mobile terminal 201 disconnects an old network (network X 202) (step S211).

As described above, Inter-RAT handover of a multi-mode mobile terminal defined in the IEEE 802.21 newly performs an authentication and encryption key acquisition procedure while the mobile terminal performs layer-2 handover to a new network. Accordingly, substantial delay of a user service is expected and data may be damaged.

DISCLOSURE

Technical Problem

An object of the present invention devised to solve the problem lies in providing a pre-authentication method having less of an effect on currently served service quality and a method for efficiently performing handover using the pre-authentication method by performing authentication before a link layer handover procedure with a target access point when a multi-mode mobile terminal performs Inter-RAT handover.

Another object of the present invention is to provide a method for performing the pre-authentication procedure based on MIH in consideration of different authentication types between heterogeneous networks and different authentication capabilities. To this end, various MIH primitives necessary for a specific procedure are defined to easily perform the pre-authentication method proposed by the present invention.

Technical Solution

The object of the present invention can be achieved by providing a method of performing, by a multi-mode mobile station (MS), handover between heterogeneous radio access networks. The method includes acquiring information about candidate target access networks as well as a current access network connected to the multi-mode MS, directly or indirectly transmitting a pre-authentication request message to a selected target access network among the candidate target access networks, directly or indirectly receiving pre-authentication result information in response to the pre-authentication request message from the selected target access network, and performing handover to the selected target access network using the pre-authentication result information without any additional authentication process.

At least one of the acquiring information, transmitting a pre-authentication request message, receiving pre-authentication result information, and performing handover may be performed using a media independent handover (MIH) primitive.

When the transmitting a pre-authentication request message is performed using an MIH pre-authentication request primitive, the MIH pre-authentication request primitive may include at least one of an identifier (ID) of the current access network, an ID of an authentication server of the current access network, an ID of the selected target access network, an ID of an authentication server of the selected target access network, an ID of the multi-mode MS, and a pre-authentication request indicator.

When the receiving is performed using an MIH pre-authentication response primitive, the MIH pre-authentication response primitive may include at least one of an ID of the current access network, an ID of an authentication server of the current access network, an ID of the selected target access network, an ID of an authentication server of the selected target access network, an ID of a home subscriber server (HSS) of the selected target access network, a pre-authentication result status ID, and a pre-authentication result transfer status ID.

Selection of parameters may be determined according to whether the pre-authentication primitive and/or MIH pre-authentication response primitive are transmitted via the current access network to the target access network or are directly transmitted to the target access network, or according to a type of the target access network.

The pre-authentication request message and the pre-authentication result information may be respectively transmitted and received via the current access network if the transmitting and receiving are indirectly performed.

The pre-authentication request message and the pre-authentication result information may be respectively transmitted and received by an MIH entity of the multi-mode MS, and the method may further include receiving, by the MIH entity of the multi-mode MS, the pre-authentication request message from an MIH user entity of the multi-mode MS, before the MIH entity transmits the pre-authentication request message, and notifying, by the MIH entity, the MIH user entity of the pre-authentication result information, after the MIH entity receives the pre-authentication result information.

The notifying the MIH user entity of the pre-authentication result information may be performed using an MIH pre-authentication confirmation primitive, and the MIH pre-authentication confirmation primitive may include at least one of an ID of the current access network, an ID of an authentication server of the current access network, an ID of the selected target access network, an ID of an authentication server of the selected target access network, a pre-authentication result status ID, and a pre-authentication result transfer status ID.

In another aspect of the present invention, provided herein is a method of supporting, by a specific access network, a handover between heterogeneous radio access networks, wherein a multi-mode mobile station (MS) performs the handover to the specific access network as a target access network. The method includes receiving a pre-authentication request message from the multi-mode MS, transmitting pre-authentication result information in response to the pre-authentication request message to the multi-mode MS, and supporting the multi-mode MS to perform handover to the target access network by using the pre-authentication result information without any additional authentication process.

At least one of the receiving a pre-authentication request message and transmitting pre-authentication result information may be performed using a media independent handover (MIH) primitive.

The pre-authentication request message and the pre-authentication result information may be respectively received and transmitted by an MIH entity of the specific access network, and the method may further include transmitting the pre-authentication request message to an authentication server of the specific access network via a security entity of the specific access network, after the MIH entity of the specific access network receives the pre-authentication request message, and receiving the pre-authentication result information from the security entity, before the MIH entity transmits the pre-authentication result information.

In a further aspect of the present invention, provided herein is a method of supporting, by a specific access network, handover between heterogeneous radio access networks, wherein a multi-mode mobile station (MS) performs the handover to a target access network different from the specific access network. The method includes receiving a pre-authentication request message from the multi-mode MS, transmitting pre-authentication result information in response to the pre-authentication request message to the target access network, receiving a response message in response to the pre-authentication result information from the target access network, and transmitting a pre-authentication response message to the multi-mode MS, wherein the pre-authentication response message includes the pre-authentication result information and information about the response message of the target access network.

At least one of the receiving a pre-authentication request message, transmitting pre-authentication result information, receiving a response message, and transmitting a pre-authentication response message may be performed using a media independent handover (MIH) primitive.

The receiving the pre-authentication request message, transmitting the pre-authentication result information, receiving the response message and transmitting the pre-authentication response message may be performed in the MIH entity of the specific access network, and the method may further include transmitting the pre-authentication request message to an authentication server of the target access network via a security entity of the specific access network, after an MIH entity of the specific access network receives the pre-authentication request message, and receiving the pre-authentication result information from the security entity, before the MIH entity transmits the pre-authentication result information to the target access network.

The MIH entity of the specific access network may transmit the pre-authentication request message to the security entity using an MIH pre-authentication indication primitive, and the MIH pre-authentication indication primitive may include at least one of an ID of the specific access network, an ID of an authentication server of the specific access network, an ID of the target access network, an ID of an authentication server of the target access network, an ID of the multi-mode MS, and a pre-authentication request indicator.

The receiving the pre-authentication result information may be performed using an MIH pre-authentication result transfer request primitive, and the MIH pre-authentication result transfer request primitive may include at least one of an ID of the specific access network, an ID of an authentication server of the specific access network, an ID of the target access network, an ID of an authentication server of the target access network, pre-authentication result status information, an ID of the multi-mode MS, an ID for re-authentication, and a security context used by authentication means in the target access network.

The receiving the response message may be performed using an MIH pre-authentication result transfer response primitive, and the MIH pre-authentication result transfer response primitive may include at least one of an ID of the target access network, an ID of an authentication server of the target access network, an ID of a home subscriber server (HSS) of the target access network, an ID of the multi-mode MS, an ID for re-authentication, a pre-authentication result transfer status indicator, and an information list which is not acquired among security contexts used by authentication means in the target access network.

ADVANTAGEOUS EFFECTS

According to the exemplary embodiments of the present invention, a pre-authentication method having less of an effect on currently served service quality and a method for efficiently performing handover using the pre-authentication method can be provided by performing authentication before a link layer handover procedure with a target access point when a multi-mode mobile terminal performs Inter-RAT handover.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
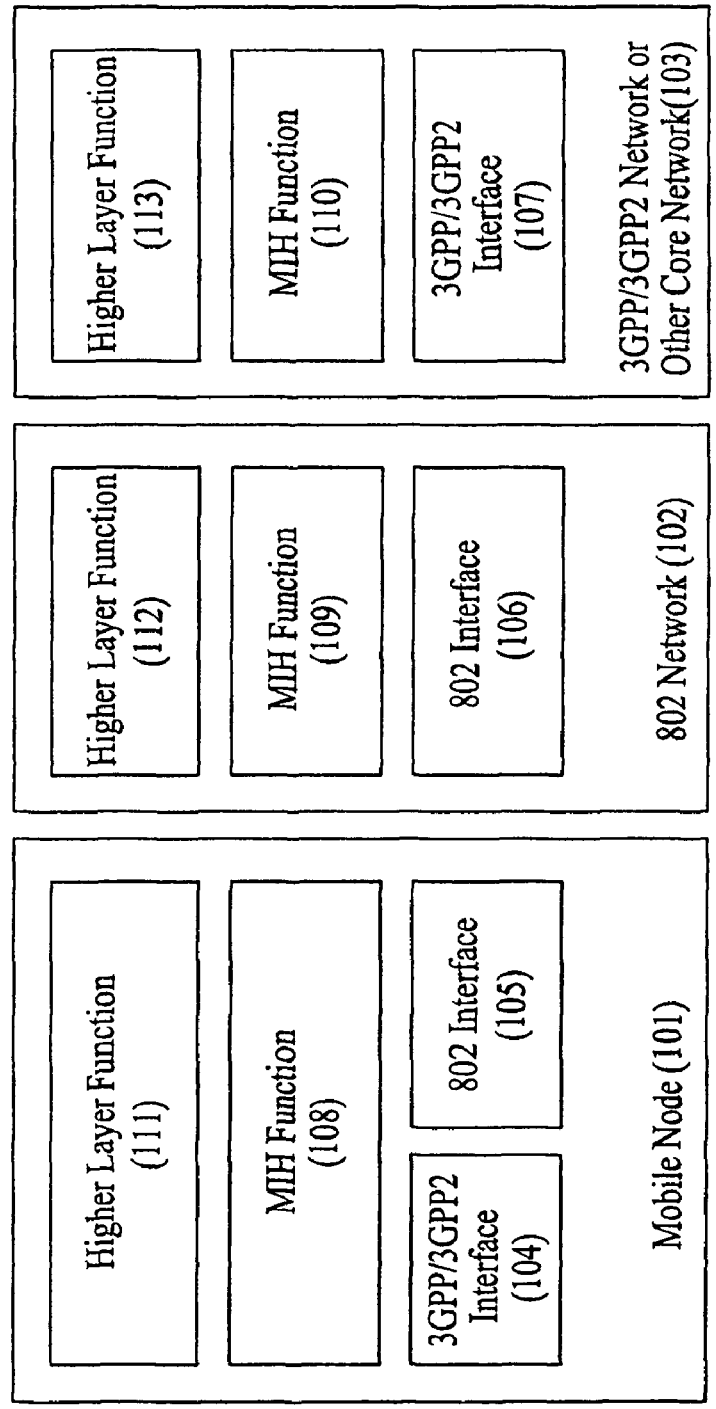
FIG. 1 illustrates a protocol layer configuration of a mobile terminal, an 802-series network, and a 3GPP/3GPP2 network.
Figure 2:
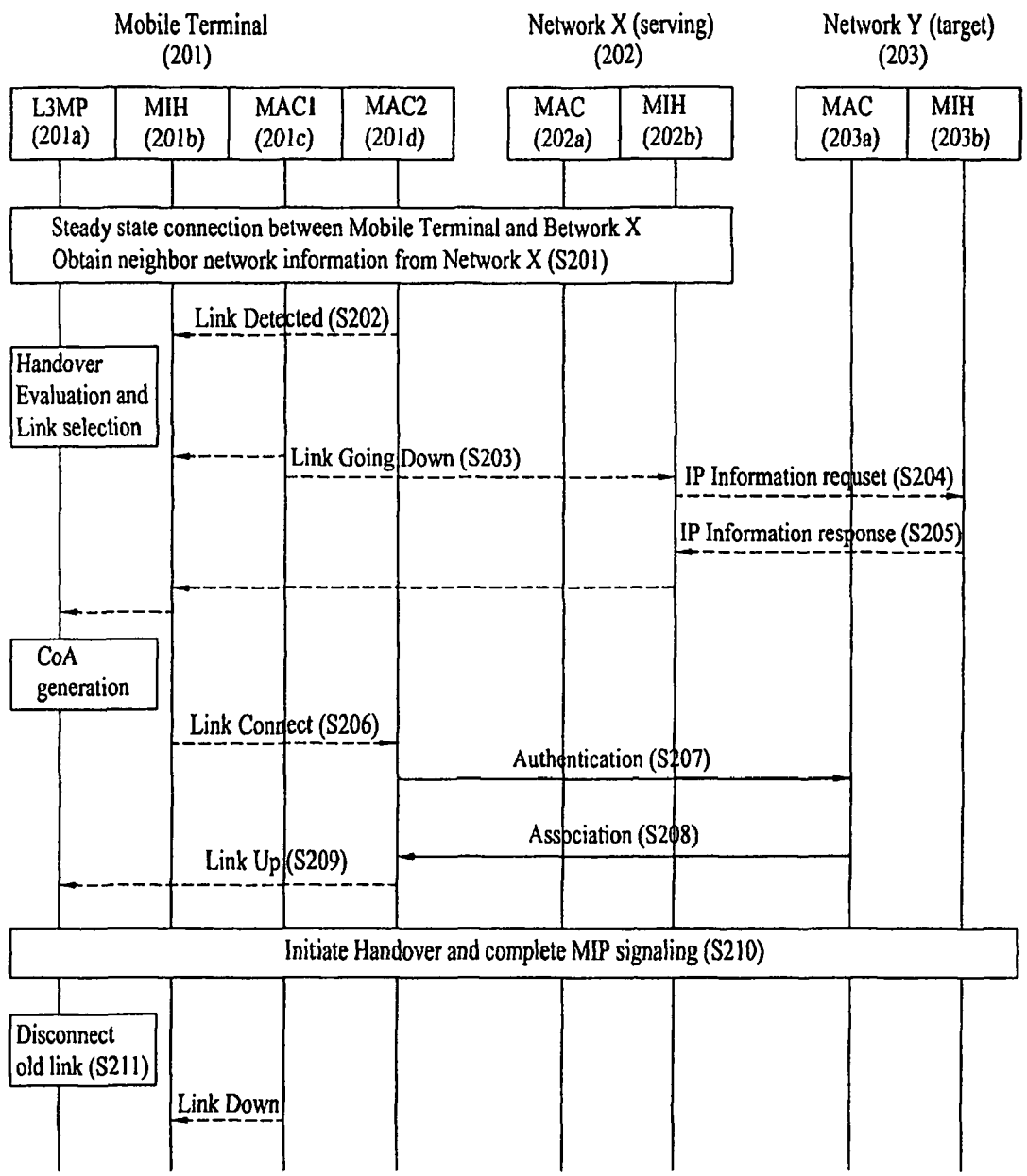
FIG. 2 illustrates a handover procedure between heterogeneous radio access networks by an MIH-based multi-mode mobile terminal.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description is explained of an IEEE 802.16 system as a current access network, and an 802-series system or a 3GPP/3GPPs system as a target access network. However, a pre-authentication method and a handover method using the same may be applied to handover between any different heterogeneous networks according to the same principle.

Meanwhile, in some instances, known structures and devices are omitted or are shown in block diagram form, focusing on important features of the structures and devices, so as not to obscure the concept of the present invention. The same reference numbers will be used throughout this specification to refer to the same or like parts.

The present invention provides an MIH-based pre-authentication method having as little an effect on currently served quality of service (QoS) as possible by performing authentication before a multi-mode mobile terminal performs a link layer handover procedure with a target access point during Inter-RAT handover. In a homogeneous environment considering a single administrative domain, handover can be supported without an authentication server. However, in a heterogeneous environment operated by multiple administrative domains, since an authentication server generates different authentication results according to an authenticator type and capability, a flexible and efficient security mechanism should be defined. As an example, when handover occurs between an IEEE 802.11 network and an IEEE 802.16 network which use extensible authentication protocol (EAP)-based authentication, if the two access networks are operated by a single service provider, no problems related to the handover are present. However, if heterogeneous radio access networks are operated by a plurality of service providers, since a handover mechanism which does not pass through an authentication server can not be utilized, such a problem should be solved.

The present invention proposes a method for performing pre-authentication before a mobile terminal performs link layer handover to a target network access point and setting keying materials for communication, when the multi-mode mobile terminal of an IEEE 802.16 radio access network using EAP as an authentication framework performs handover to another IEEE 802-series radio access network such as a radio LAN using an EAP-based authentication framework or when the mobile terminal performs handover to a non-IEEE series radio access network (for example, a 3GPP network) which does not use EAP as a basic authentication framework. Since the multi-mode mobile terminal previously performs an authentication procedure for a corresponding mobile terminal which consumes much time before accessing a new access point, fast security association is set and deterioration of QoS is reduced. In the following description, although an IEEE 802.16 network is described as an example of an access network of the start of handover, other IEEE 802-series networks (e.g., 802.11) may be employed.

A method proposed by the present invention is suitable for application to the IEEE 802.21 standard. That is, up to now, the IEEE 802.21 standard does not mention security related issues and thus the present method may be a technique for improving the standard. However, an MIH-based pre-authentication method and an Inter-RAT handover method using the same which will be described hereinbelow may be applied to other standards as well as the IEEE 802.21 standard.

Pre-authentication proposed according to the present invention serves to previously obtain authentication from at least one access point by requesting a neighbor access point as well as a current access point to grant authentication. Namely, pre-authentication serves to previously obtain authentication not from a current access network but from a neighbor target access network when Inter-RAT handover occurs, as an expansion of a concept of a conventional pre-authentication. Then an authenticator of the target access network in a final step of pre-authentication can obtain keying materials related to a corresponding mobile terminal, and the mobile terminal previously obtains authentication from the target access network and simultaneously obtains keying materials.

To improve capability of handover, the present invention is designed to provide a universal technique in access technologies in which optimization of a security mechanism is different, and to this end, using the above-described MIH is considered.

The pre-authentication method of the present invention handles not Inter-RAT handover between networks operated by a single service provider (administrative domain) but Inter-RAT handover between networks operated by different service providers (administrative domains). Namely, it is assumed that a serving authenticator, and a target authenticator expecting handover are based on different access technologies of different service provider networks. Under such a circumstance, the present invention allows a mobile terminal to previously obtain authentication before connecting a target access point and to set a security key for communication. Since a pre-authentication procedure assumes the use of an MIH function, it may be applicable to various scenarios irrespective of access technologies.

In the present invention, since a pre-authentication procedure is performed during Inter-RAT handover between different networks operated by different administrative domains through MIH of a multi-mode mobile terminal, a load delay, which may occur when authentication is newly performed as in a conventional technology, is reduced and a fast handover procedure can be performed. Therefore, the present invention defines a method for reducing damage of service continuity or deterioration of QoS. This includes a method for transmitting keying materials for communication to be used in a target network during Inter-RAT handover to an authenticator of the target network and a mobile terminal before link layer handover is completed.

The present invention is suitable for application to the IEEE 802.21 standard as described above. Namely, since the IEEE 802.21 standard does not describe an authentication and security association setting method for MIH, if Inter-RAT handover between different networks is performed by carrying out pre-authentication through MIH of the IEEE 802.21, a continuous service can be provided with minimal effect on QoS. The present invention is applied to an Inter-RAT handover scenario between networks operated by different service providers rather than to an Inter-RAT handover scenario operated by the same service provider. However, the proposed method may be applied to other standards other than IEEE 802.21 to obtain the same effect.

The proposed pre-authentication method is basically based on using an information service of the IEEE 802.21 in order to acquire information such as detection of a neighbor network or roaming agreement between neighbor networks. That is, a mobile terminal can obtain information as to which candidate networks are present in the vicinity thereof from an IEEE 802.21 information server. The mobile terminal ends a pre-authentication procedure through the information obtained from the information server before connecting a target access point and can previously set keying materials. Accordingly, a delay generated during handover can be reduced.

It is desirable that the IEEE 802.21 standard consider security, such as authentication and key exchange methods, during MIH for Inter-RAT. Namely, a method for providing a continuous service to the mobile terminal performing Inter-RAT handover without creating serious load to a network is necessary.

Hereinafter, various MIH primitives proposed by the present invention are described in order to provide methods for performing pre-authentication in terms of a mobile terminal, performing handover using the same, and supporting Inter-Rat handover of the mobile terminal in terms of a serving network and/or a target network. Although the MIH primitives include specific details in order for those skilled in the art to easily implement the present invention, selective information out of primitive names and a description of primitives may be defined differently from the following description.

The present invention considers obtaining a type of at least one neighbor candidate access network to which handover is to be performed by a mobile terminal, or other related information using the following primitives provided in the IEEE 802.21 standard.

TABLE 1

| Primitives | Description |
| --- | --- |
| MIH_Information.Request | 1) A remote MIH primitive defined in the IEEE 802.21 standard. Transferred to an MIH of a current serving network from MIH of a mobile terminal. Used for a mobile terminal to request information about a network for handover and may be used to discern an authentication type supported by a corresponding network.<br>2) Primitive configuration<br>MIH_Information.Request{<br>    InfoQueryFilter: type of an information request network (e.g., 802, GSM, CDMA, etc.)<br>    InforQueryParameters: specific parameters of request information (e.g., link layer information, higher layer information, security related information, etc.)<br>} |
| MIH_Information.Response | 1) A response to MIH_Information.Request primitive. Used by an MIH to provide network information to a mobile terminal. Includes lists of usable networks, geological location information, transfer technology information, network provider identifier, network provider name, IP version, roaming partner list, service level list, neighbor network information, link layer security information, link layer QoS parameter, router information, etc.<br>2) Neighbor network information of a serving network is provided by receiving MIH_Information.Request from a mobile terminal and transmitting MIH_Information.Response, and information about a neighbor network can be obtained by periodically transmitting MIH_Information.Response to mobile terminals in a broadcast form even when a mobile terminal normally communicates with a serving network.<br>3) Primitive configuration<br>MIH_Information.Response{<br>    InfoQueryFilter: network type (e.g., 802, GSM, CDMA, etc.)<br>    MIH_REPORT: specific parameters of information (e.g., neighbor information, link layer security supported, link QoS parameters, etc.<br>    Status: information transfer status (e.g., success, fail)<br>} |

Namely, to acquire information about a neighbor network while maintaining connection with a current link, a communicating mobile terminal can obtain layer-2 security related information, such as an authentication method and an encryption algorithm, through the MIH_Information.Request/Response primitives as shown in Table 1 defined in an MIH function.

Meanwhile, the present invention proposes requesting a target radio access network, which expects handover and is operated by another service provider, to perform pre-authentication and acquiring keying materials to be used in a corresponding network when pre-authentication is successfully implemented, by specifying the following MIH primitives.

TABLE 2

| Primitives | Description |
| --- | --- |
| MIH_MN_Preauth.Request | 1) A primitive transferred to an MIH function by an MIH user (security entity) of a mobile terminal and used to request a target authentication server to perform pre-authentication. The MIH function receiving this primitive generates and transmits MIH_MN_Preauth.Request of a remote message including parameters within the primitive to an MIH function of an authenticator of a current link.<br>2) Primitive configuration<br>MIH_MN_Preauth.Request{<br>    Current Link Identifier<br>    Current Authentication Server Identifier<br>    Target Link Identifier<br>    Target Authentication Server Identifier<br>    Mobile Terminal Identifier (e.g., MAC address, IMSI, etc.)<br>    Preauthentication Request indication<br>} |
| MIH_MN_Preauth.Indication | 1) A primitive informing an MIH user by an MIH function of an authenticator of a current link that an MIH_MN_Preauth.Request message has been received from a mobile terminal. The MIH user receiving this primitive transmits a pre-authentication request message to an AAA server of a current link and the pre-authentication request message is transmitted to an AAA server of a target link. |

TABLE 2-continued

| Primitives | Description |
| --- | --- |
| | 2) Primitive configuration<br>MIH_MN_Preauth.Indication{<br>    Current Link Identifier<br>    Current Authentication Server Identifier<br>    Target Link Identifier<br>    Target Authentication Server Identifier<br>    Mobile Terminal Identifier (e.g., MAC address, IMSI, etc.)<br>    Preauthentication Request indication<br>} |

TABLE 3

| Primitives | Description |
| --- | --- |
| MIH_MN_Preauth.Response | 1) A primitive transmitted to an MIH function by an MIH user of an authenticator of a current link in order to inform the MIH function of a pre-authentication result from an authentication server of a target link with respect to a pre-authentication procedure requested by a mobile terminal. The MIH function receiving this primitive generates and transmits MIH_MN_Preauth.Response of a remote message including parameters within the primitive to an MIH function of the mobile terminal. This primitive may include network unique security related contexts.<br>2) Primitive configuration<br>MIH_MN_Preauth.Response{<br>    Current Link Identifier<br>    Current Authentication Server Identifier<br>    Target Link Identifier<br>    Target Authentication Server Identifier<br>    Target HSS Identifier<br>    Preauthentication Result Indication (e.g., success, failure)<br>    Protected Pseudonym (e.g., TMSI, re-authentication ID)<br>} |
| MIH_MN_Preauth.Confirmation | 1) A primitive used to inform an MIH user by an MIH function of a mobile terminal that MIH_MN_Preauth.Response has been received. This primitive includes parameters contained in MIH_MN_Preauth.Response and is used to provide to an MIH user of a mobile terminal a result as to whether authentication from an authentication server of a target link is successful. This primitive may include network unique security related contexts.<br>2) Primitive configuration<br>MIH_MN_Preauth.Confirmation{<br>    Current Link Identifier<br>    Current Authentication Server Identifier<br>    Target Link Identifier<br>    Target Authentication Server Identifier<br>    Preauthentication Result Indication (e.g., success, failure)<br>    Protected Pseudonym (e.g., TMSI, re-authentication ID)<br>} |

Namely, a mobile terminal may use the MIH_MN_Preauth.Request and MIH_MN_Preauth.Indication primitives of Table 2 in order to request an authentication server of a target link operated by a different administrative domain to perform pre-authentication and these primitives are transferred to an AAA server of the target link to perform pre-authentication for a mobile terminal. Specifically, a pre-authentication procedure for a mobile terminal may be performed through IETF protocol. The use of the respective parameters will be described in each exemplary embodiment.

Meanwhile, the MIH_MN_Preauth.Response/Confirmation primitives shown in Table 3 are used for an authenticator of a current link to transmit to the mobile terminal a pre-authentication result for a specific mobile terminal, which is transferred by an authentication server of a target link. Namely, a pre-authentication request of the mobile terminal is transmitted to a target authentication server of another service provider through an authenticator and an authentication server of a current link, or is directly transmitted to an authentication server of another service provider through an authenticator of a target link. The authentication server of the target link receiving the pre-authentication request performs pre-authentication and transmits a pre-authentication result to the authentication server of a serving link. The pre-authentication result is finally transmitted to the mobile terminal via the authenticator of the current link by the authentication server of the serving link or is directly transmitted to the mobile terminal.

Meanwhile, the present invention additionally proposes the following primitives as MIH primitives for transmitting a pre-authentication result for a specific mobile terminal and keying materials generated due to pre-authentication in terms of a network.

TABLE 4

| Primitives | Description |
| --- | --- |
| MIH_Net_Preauth_Result_Transfer.Request | 1) A primitive transferred to an MIH function by an MIH user of an authenticator of a current link and used to transmit an authentication result for a specific mobile terminal and keying material to an authenticator of a target link to perform pre-authentication by a mobile terminal. The MIH function receiving this primitive generates and transmits MIH_Net_Preauth_Result_Transfer.Request of a remote MIH protocol message to the authenticator of the target link.<br>2) Primitive configuration<br>MIH_Net_Preauth_Result_Transfer.Request{<br>    Current Link Identifier<br>    Current Authentication Server Identifier<br>    Target Authentication Server Identifier<br>    Preauthentication Result Status (e.g., success, failure)<br>    Mobile Terminal Identifier (e.g., MAC address, IMSI, etc.)<br>    Protected Pseudonym (e.g., TMSI, re-authentication ID)<br>    Keying Material: Security contexts which are used by an authenticator of a target link and may be used to set security association between a mobile terminal and a network.<br>} |
| MIH_Net_Preauth_Result_Transfer.Indication | 1) A primitive used to inform an MIH user by an MIH function of an authenticator of a target link that MIH_Net_Preauth_Result_Transfer.Request has been received from an MIH of an authenticator of a current link. The MIH user receiving this primitive generates and transmits MIH_Net_Preauth_Result_Transfer.Response which is a primitive used to inform the MIH function of a pre-authentication result.<br>2) Primitive configuration<br>MIH_Net_Preauth_Result_Transfer.Indication {<br>    Target Authentication Server Identifier<br>    Target HSS Identifier<br>    Preauthentication Result Status (e.g., success, failure)<br>    Mobile Terminal Identifier (e.g., MAC address, IMSI, etc.)<br>    Protected Pseudonym (e.g., TMSI, re-authentication ID)<br>    Keying Material: Security contexts which are used by an authenticator of a target link and may be used to set security association between a mobile terminal and a network.<br>} |

TABLE 5

| Primitives | Description |
| --- | --- |
| MIH_Net_Preauth_Result_Transfer.Response | 1) A primitive transferred to an MIH function by an MIH user of an authenticator of a target link and used to inform whether a pre-authentication result for a specific mobile terminal and keying materials have been normally transmitted. Parameters transmitted through this parameter include a status for a transfer request of the pre-authentication result and related keying materials and include lists of keying materials which have not been normally transmitted. The MIH function receiving this primitive generates and transmits MIH_Net_Preauth_Result_Transfer.Response to an MIH of an authenticator of a serving link.<br>2) Primitive configuration<br>MIH_Net_Preauth_Result_Transfer.Response{<br>    Target Link Identifier<br>    Target Authentication Server Identifier<br>    Target HSS Identifier<br>    Mobile Terminal Identifier (e.g., MAC address, IMSI, etc.)<br>    Protected Pseudonym (e.g., TMSI, re-authentication ID)<br>    List of not Acquired Keying Materials<br>    Preauthentication Result Transfer Status (e.g., success, failure)<br>} |
| MIH_Net_Preauth_Result_Transfer.Confirmation | 1) A primitive used to inform an MIH user by an MIH of an authenticator of a serving link that MIH_Net_Preauth_Result_Transfer.Response has been received. Parameters contained in this primitive are as follows.<br>2) Primitive configuration<br>MIH_Net_Preauth_Result_Transfer.Confirmation {<br>    Target Link Identifier<br>    Mobile Terminal Identifier (e.g., MAC address, IMSI, etc.)<br>    List of not Acquired Keying Materials<br>    Preauthentication Result Transfer Status (e.g., success, failure)<br>} |

Specifically, Table 4 illustrates primitives used to transmit a pre-authentication result for a specific mobile terminal and keying materials generated due to pre-authentication. Table 5 illustrates primitives used for an authenticator of a target link to inform an authenticator of a current link whether the pre-authentication result for a corresponding mobile terminal and the keying materials have been transmitted through the primitives shown in Table 4.

Meanwhile, exemplary embodiments propose to satisfy the following conditions to implement a method proposed according to the present invention.

1) Security credentials shared for a long time by a mobile terminal and a network in a radio access technology such as 3GPP/3GPP2 may be stored in a subscriber identity module (SIM) card or universal integrated circuit card (UICC) of a multi-mode mobile terminal.

2) Protection for pre-authentication related signaling exchanged between a serving network and a target network or for keying materials may be provided.

3) An IEEE 802.16 network may contract roaming agreement for interconnection with a 3GPP network or other heterogeneous networks.

4) For protection of user identifiers (e.g., IMSI, TMSI, and MAC address), those identifiers may not be exposed.

As described above, a mobile terminal of a serving access network performs pre-authentication with a target access network through the serving access network or directly performs pre-authentication through a target access network, using an MIH information service before performing handover to the target access network. The mobile terminal may perform pre-authentication with one or more access networks. The respective access networks operate different authentication, authorization and accounting (AAA) servers. An EAP server function for authentication is included in the AAA server. Communication between an authenticator and an authentication server may be achieved through remote authentication dial in user service (RADIUS) or an AAA protocol such as diameter improving the RADIUS.

If a target authenticator uses an EAP-based master session key (MSK) to generate a key of a link layer such as an IEEE 802.16 or IEEE 802.11 network, a pre-authentication procedure may set security association between a mobile terminal and a network (a base station or an access point) by generating the MSK for the target authenticator.

The present invention proposes two forms of pre-authentication methods between a mobile terminal, a serving authenticator, a target authenticator, and an authentication server. The pre-authentication methods differ according to how a serving authenticator is related to pre-authentication signaling. Namely, the present invention proposes the following direct pre-authentication method and indirect pre-authentication method.

First, in the direct pre-authentication method, pre-authentication signaling is transparently exchanged between a mobile terminal and a target authenticator and this signaling is transferred to a target authentication server via a target authenticator. Next, in the indirect pre-authentication method, a serving authenticator is associated with the pre-authentication signaling, and this method is proposed as a technique necessary when IP communication between a target authenticator and a mobile terminal is not permitted for security reasons. Namely, the indirect pre-authentication signaling is divided into signaling between the mobile terminal and the serving authenticator and signaling between the serving authenticator and the target authenticator. The signaling between the serving authenticator and the target authenticator includes an authentication server of a serving access network and an authentication server of a target access network.

An exemplary embodiment using the indirect pre-authentication of the above-described examples will be described in detail with reference to the drawing.

Figure 3:
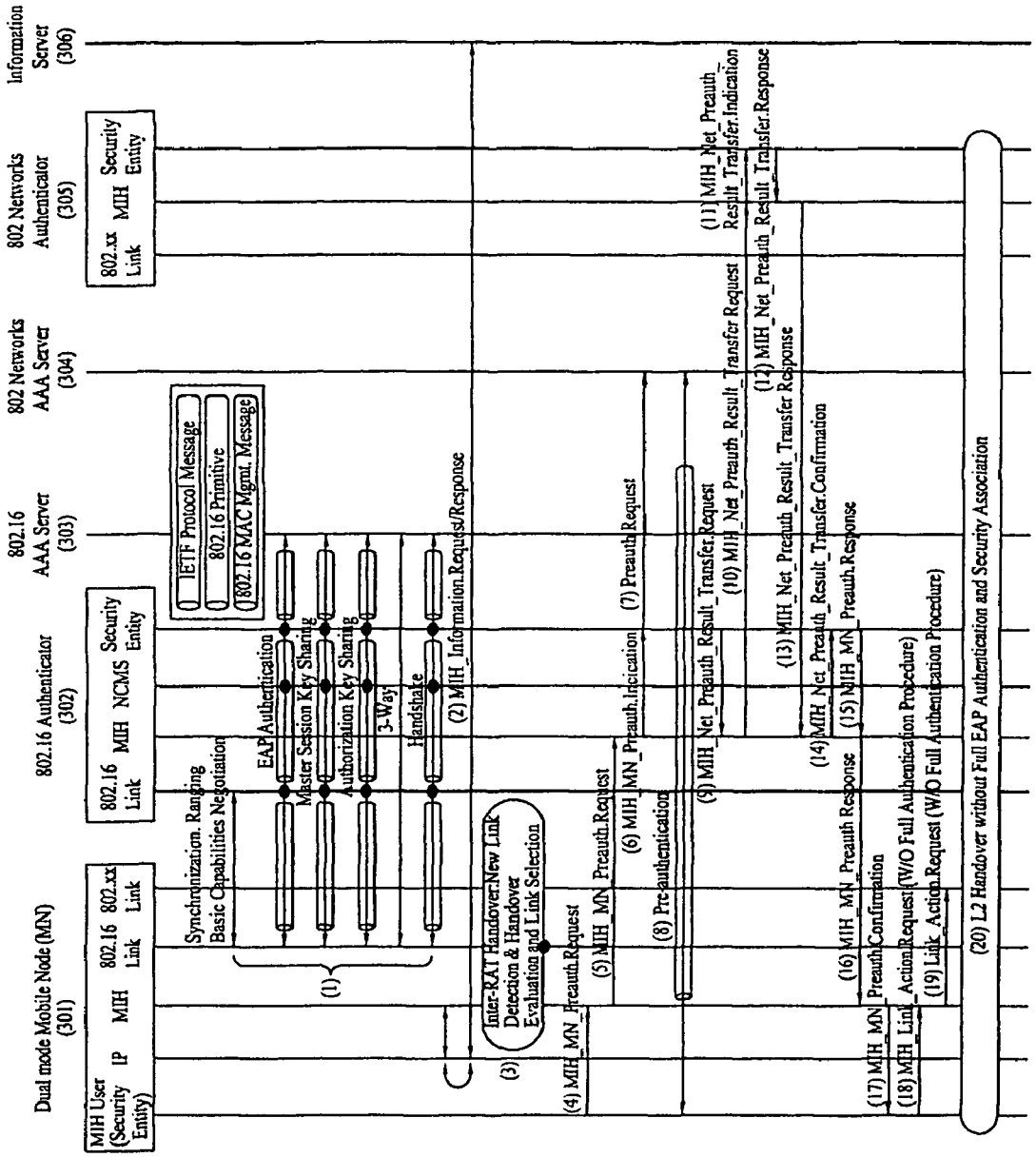
FIG. 3 illustrates a process of performing pre-authentication via a current access network by a multi-mode mobile terminal served by an IEEE 802.16 network and then performing Inter-RAT handover to another IEEE 802-series network, according to an exemplary embodiment of the present invention.

FIG. 3 illustrates a process of performing pre-authentication via a current link by a multi-mode mobile terminal served by an IEEE 802.16 network and then performing Inter-RAT handover to another IEEE 802-series network, according to an exemplary embodiment of the present invention.

In FIG. 3, an authenticator of a current link transmits a pre-authentication request of a mobile terminal to an authentication server of a target link through an authentication server of the current link. The authentication server of the target link receiving the request performs pre-authentication for a corresponding mobile terminal and transmits a pre-authentication result to an authenticator of the target link through the authenticator of the current link. Next, the authenticator of the target link reports a response to the pre-authentication result to the authenticator of the current link. The authenticator of the current link transmits keying materials to be used in the target link to the mobile terminal as the pre-authentication result.

In this exemplary embodiment, it is assumed that authentication servers do not support an MIH function, because it is not easy to add the MIH function by correcting an AAA framework defined by current IETF. However, the present invention does not exclude the concept of directly exchanging corresponding MIH primitives by support of the MIH function by the authentication servers.

Of the two forms of performing pre-authentication, FIG. 3 illustrates transmission of a pre-authentication request through an authenticator of a serving link, and in this case, the MIH primitives defined in Table 2 and Table can be selectively used. That is, the primitives proposed in Table 2 are not always used, and parameters of the current link identifier and the current authentication server identifier may be excluded. Similarly, the above two parameters in the primitives proposed in Table 3 may be excluded.

Each procedure illustrated in FIG. 3 will be explained based on the above description.

(1) First, step (1) illustrates a process of sharing a master session key (MSK) and an authorization key (AK) through EAP-based authentication and sharing a traffic encryption key (TEK) through 3-way handshake by access of a multi-mode mobile node 301 to an IEEE 802.16 network. If other IEEE 802-series networks other than the IEEE 802.16 network are used, a similar form of an initial authentication procedure based on EAP may be implemented.

(2) The multi-mode mobile node 301 which is communicating while maintaining connection with the IEEE 802.16 network acquires information about at least one neighbor candidate network from an information server 306 (step (2)). The information about the neighbor network can be obtained through an information service defined in MIH as described previously, for example, through MIH information request/response primitives such as MIH_Information.Request/Response primitives shown in Table 1. The mobile node can receive a link layer security related parameter such as an authentication method/encryption algorithm of a neighbor network using those primitives. For instance, an MIH of an IEEE 802.16 network 302 operated by a current administrative domain may request an MIH of an 802-series network 305 to which handover is expected to transmit IP information and may transmit the IP information to the mobile node 301. An IP address may be used during handover of the mobile node.

(3) The mobile node 301 receives a signal from a neighbor network through scanning and performs a link detection/selection procedure (step (3)). As a result of step (3), it is assumed that the 802-series network 305 is operated by a different administrative domain as a potential handover target link. The 802-series network assumes inclusion of an IEEE 802.16 network, an IEEE 802.11 network, etc.

(4) When recognizing that a signal level received from the IEEE 802.16 network is lower than a prescribed level, the mobile node 301 transmits an MIH pre-authentication request primitive such as the MIH_MN_Preauth.Request proposed in Table 2 to an MIH entity thereof to command that the MIH entity perform a pre-authentication procedure (step (4)). The MIH pre-authentication request primitive may include, as the MIH_MN_Preauth.Request primitive illustrated in Table 2, an identifier of a current link 302, an identifier of a current authentication server 303, an identifier of the target link 305, an identifier of a target authentication server 304, an identifier of the multi-mode mobile node 301, and a pre-authentication request indicator.

Thus an MIH user of the mobile node 301, i.e., an MIH higher layer may request the MIH of the mobile node 301 to transmit a pre-authentication procedure request to the 802-series network authentication server 304 of a target link. The pre-authentication procedure request may be transmitted to the 802-series network authentication server 304 via the 802.16 network authenticator 302 and the 802.16 network authentication server 303. Although this embodiment illustrates the case where the AAA server including an EAP function does not support MIH, the present invention is not limited thereto.

Moreover, since it is assumed in step (4) that the pre-authentication procedure is performed before layer-2 handover is implemented, a prescribed threshold value used when determining whether the signal level received from the current link is lower than the prescribed level is desirably set to a higher level than a threshold value used to determine layer-2 handover initiation. However, various methods may be used in addition to the above-described method for performing the pre-authentication before initiation of a substantial handover procedure.

(5) In step (5), the MIH of the mobile node 301 receiving the MIH pre-authentication request primitive such as the MIH_MN_Preauth.Request primitive generates and transmits an MIH_MN_Preauth.Request protocol message of an MIH remote protocol message to the MIH of the IEEE 802.16 network authenticator 302 of a serving network (step (5)). This message may include parameters within the MIH pre-authentication request primitive in step (4).

(6) Next, the MIH of the IEEE 802.16 network authenticator 302 generates and transmits an MIH pre-authentication indication primitive such as the MIH_MN_Preauth.Indication primitive illustrated in Table 2 in order to inform an MIH user of the authenticator 302 of a received result of the remote protocol message (step (6)). The MIH pre-authentication indication primitive may include, as illustrated in Table 2, an identifier of the current link 302, an identifier of the current authentication server 303, an identifier of the target link 305, an identifier of the target authentication server 304, an identifier of the multi-mode mobile node 301, and a pre-authentication request indicator.

(7) In step (7), a security entity, which is in charge of security of the authenticator 302, receiving the MIH pre-authentication indication primitive in step (6) transmits a pre-authentication request message to the AAA server 304 linked with the target 802-series network 305 through the AAA server 303 linked with the IEEE 802.16 network 302.

(8) Next, a pre-authentication procedure is performed between the mobile node 301 and the AAA server 304 of the target link (step (8)). The pre-authentication procedure is associated with the mobile node 301, the serving authenticator 302, the serving authentication server 303, and the target authentication server 304. The pre-authentication result is also transmitted to the MIH user of the serving authenticator 302. In this embodiment, although authentication credentials used in the serving link may not be identical with authentication credentials used in the target link, this problem can be solved by obtaining information provided by the MIH information service as in step (2). That is, since the mobile node 301 can obtain information about credentials considered in the target link through the MIH information request/response primitives, the pre-authentication procedure can be performed.

(9) The IEEE 802-series AAA server 304 of the target link generates and transmits a pre-authentication response message including the pre-authentication procedure result and keying materials to be used in the target link to a security entity of the serving link 302 through the IEEE 802.16 network AAA server 303.

(10) The MIH user of the current authenticator 302 receiving the pre-authentication procedure result and keying materials to be used in the target link generates and transmits an MIH pre-authentication result transfer request primitive, such as the MIH_Net_Preauth_Result_Transfer.Request primitive illustrated in Table 4 to the MIH of the current authenticator 302 (step (10)). The MIH pre-authentication result transfer request primitive may include, as illustrated in Table 4, an identifier of the current link 302, an identifier of the current authentication server 303, an identifier of the target link 305, an identifier of the target authentication server 304, pre-authentication result status information (pre-authentication success or fail), an identifier of the multi-mode mobile node 301, protected security information, and a security context used by an authentication means of the target link.

(11) In step (11), the MIH of the current authenticator 302 receiving the MIH pre-authentication result transfer request primitive generates and transmits an MIH_Net_Preauth_Result_Transfer.Request of a remote protocol message to the MIH of the target link authenticator 305 (step (11)). This message may include parameters within the MIH pre-authentication result transfer request primitive in step (10).

(12) Next, the MIH of the target authenticator 305 receiving the MIH pre-authentication result transfer request primitive message generates an MIH pre-authentication result transfer indication primitive such as the MIH_Net_Preauth_Result_Transfer.Indication primitive illustrated in Table 4 in order to inform the MIH user of the message and transmits the generated primitive to the MIH user (step (12)). The generated MIH pre-authentication result transfer indication primitive may include, as illustrated in Table 4, a part of parameters contained in the MIH pre-authentication result transfer request primitive and partial parameters necessary for the MIH user of the target authenticator 305.

Figure 5:
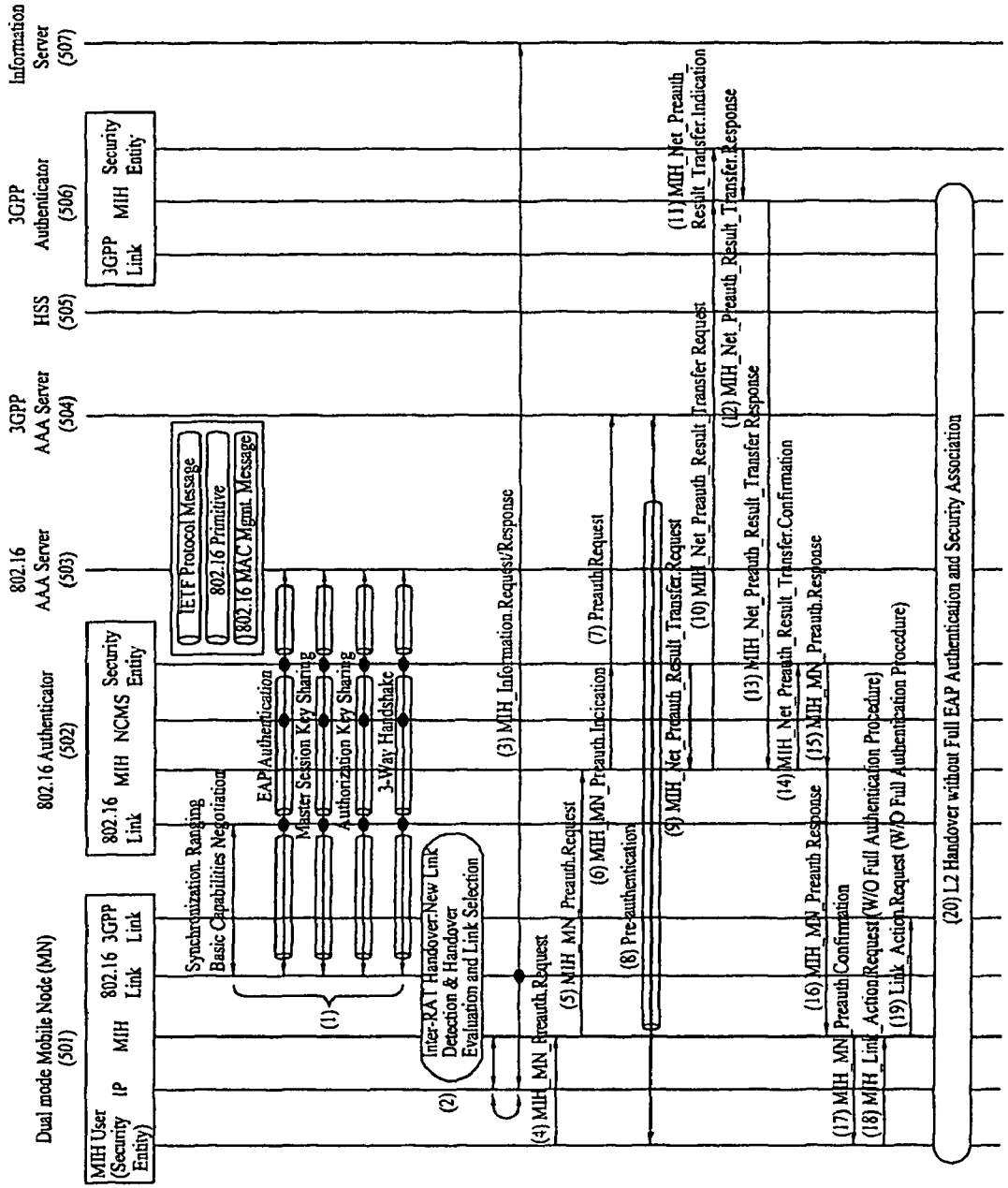
FIG. 5 and FIG. 6 illustrate processes of performing pre-authentication when a mobile node performs handover to a 3GPP network from an IEEE 802-series network according to a further exemplary embodiment of the present invention.

(13) The MIH user of the target authenticator 305 receiving the MIH pre-authentication result transfer indication primitive generates and transmits, to the MIH, an MIH pre-authentication result transfer response primitive such as the MIH_Net_Preauth_Result_Transfer.Response illustrated in Table 5 in order to transmit the pre-authentication procedure result for the mobile node 301 and a received result of keying materials generated by the target link authentication server 304 (step (13)). The MIH pre-authentication result transfer response primitive may include, as illustrated in FIG. 5, an identifier of the target link 305, an identifier of the target authentication server 304, an identifier of a target home subscriber server (HSS), an identifier of the multi-mode mobile node 301, a re-authentication ID, keying materials which are not acquired, and a pre-authentication result transfer status identifier. Among those parameters, the HSS identifier may be omitted.

(14) The MIH of the target authenticator 305 receiving the MIH pre-authentication result transfer response primitive generates and transmits an MIH_Net_Preauth_Result_Transfer. Response primitive of a remote MIH primitive to the serving authenticator 302 (step (14)). The generated primitive may include parameters contained in the MIH pre-authentication result transfer response primitive in step (13).

(15) The serving link authenticator 302 generates and transmits to the MIH user an MIH pre-authentication result confirmation primitive such as the MIH_Net.Preauth_Result_ Transfer. Confirmation primitive illustrated in Table 5 as a result of receiving the MIH pre-authentication result response primitive message as mentioned in step (14) (step (15)).

(16) The MIH user of the serving authenticator 302 receives the MIH_Net_Preauth_Result_Transfer. Confirmation primitive as described in step (15) and transmits, to the MIH of the serving authenticator 302, the MIH pre-authentication response primitive such as the MIH_MN_preauth. Response primitive illustrated in Table 3 (step (16)).

(17) The MIH of the serving authenticator 302 as mentioned in step (16) transmits the MIH_MN_Preauth. Response primitive of a remote protocol message to the MIH of the mobile node 301 (step (17)). This primitive may include parameters contained in the MIH_MN_Preauth. Response primitive described in step (16).

(18) The MIH of the mobile node 301 receiving the MIH_MN_Preauth.Response primitive message generates and transmits an MIH pre-authentication.confirmation primitive such as the MIH_MN_Preauth.Confirmation primitive illustrated in Table 3 to the MIH user of the mobile node 301 (step (18)).

(19) After the pre-authentication procedure is completed, handover with a new network, that is, a command initiating a link action procedure is transmitted from a higher management entity. In this case, the higher management entity informs that a security related procedure, which entails substantial load such as new authentication and security key setting and may lead to a delay, may be omitted (step (19)).

(20) The MIH of the mobile node 301 then transmits a link action command to a corresponding link (step (20)).

(21) The multi-mode mobile node 301 performs layer-2 (L2) handover (step (21)). At this time, a new authentication procedure is omitted, and as a result of the pre-authentication performed in step (4) to step (18), a process of newly performing authentication during registration to a target link based on information exchanged between network entities (authenticator and authentication server) of the serving link and the target link and setting keys may be omitted.

If the layer-2 handover is completed, a MAC of the mobile node 301 sets security association with an access point of the target link and can be ready for communication.

The above-described embodiment explained with reference to FIG. 3 shows a scenario when the multi-mode mobile node served in the IEEE 802.16 network transmits a pre-authentication request through an authenticator of a serving link and performs handover to the 802-series network. However, step (16) to step (18) may be omitted for an optimal procedure.

Hereinafter, an exemplary embodiment will be described in which the multi-mode mobile node directly transmits to an authenticator of a target link to cause an authentication server of the target link to perform a pre-authentication procedure.

Figure 4:
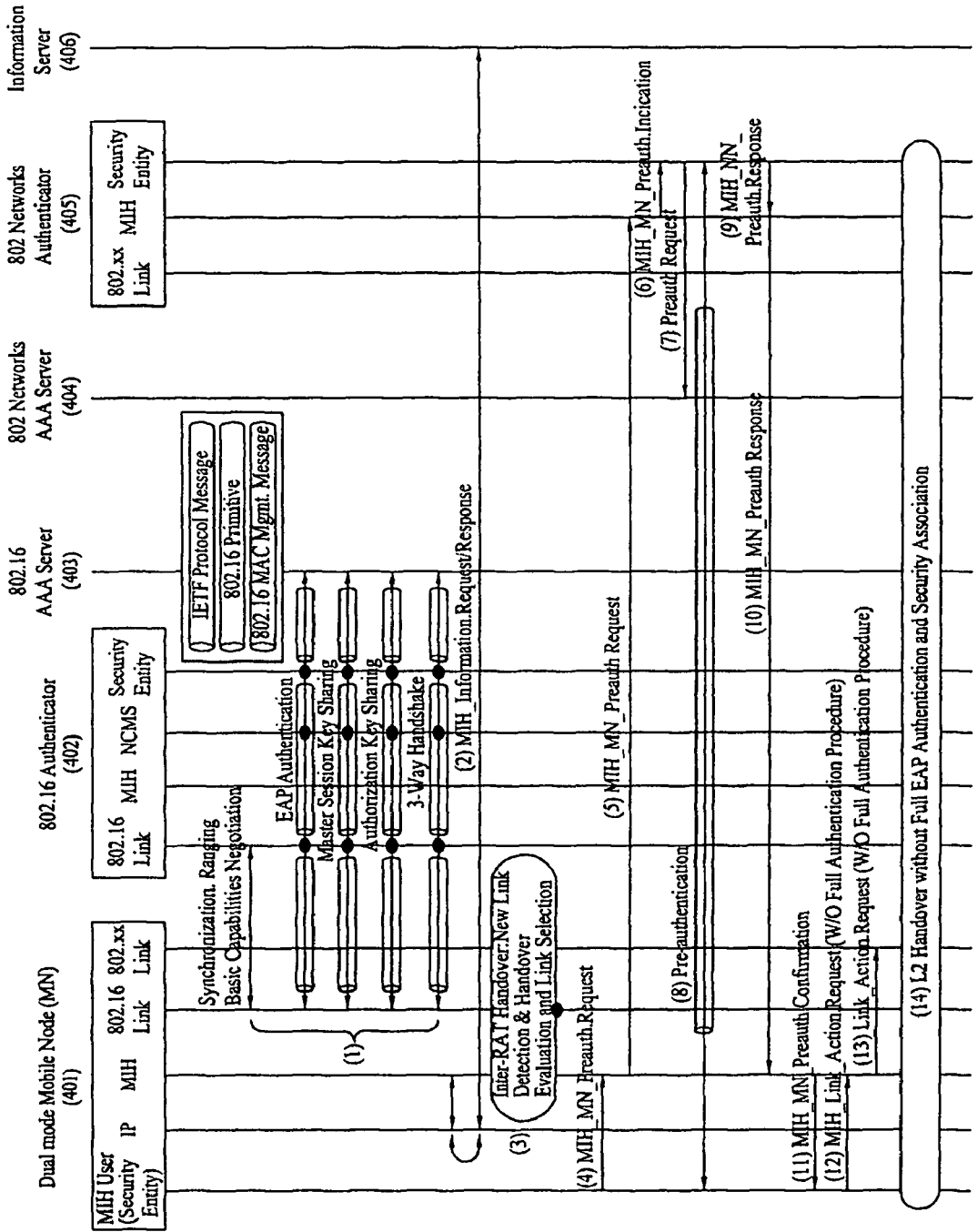
FIG. 4 illustrates a process of directly performing pre-authentication with a target link without intervening a current link by a multi-mode mobile terminal served by an IEEE 802.16 network and then performing Inter-RAT handover to an IEEE 802-series network, according to another exemplary embodiment of the present invention.

FIG. 4 illustrates a process of directly performing pre-authentication with a target link without intervening a current link by a multi-mode mobile terminal served by an IEEE 802.16 network and then performing Inter-RAT handover to an IEEE 802-series network, according to another exemplary embodiment of the present invention.

Compared with FIG. 3, a procedure of FIG. 4 is basically identical to the procedure of FIG. 3 except that a multi-mode mobile node 401 directly requests a target authenticator 405 and a target authentication server 404 to perform pre-authentication and receives a result of the pre-authentication, and a current authenticator 402 and a current authentication server 403 are not associated with a pre-authentication process of the current authenticator 405 and authentication server 404 and implements only a relay function. Hereinbelow, pre-authentication performed when a current authenticator and a current authentication server implement only relay of layer-2 irrespective of a pre-authentication procedure will be referred to as "direct pre-authentication", and pre-authentication performed when the current authenticator and authentication server are substantially related to the pre-authentication procedure, specifically, entail relation of layer-3 or more will be referred to as "indirect pre-authentication". To omit repetitive description, a description will be given only of different parts from FIG. 3 illustrating the indirect pre-authentication according to each step of FIG. 4 illustrating the direct pre-authentication procedure.

In FIG. 4, a pre-authentication request is directly transmitted to the target authenticator 405. In this case, since a pre-authentication result is transmitted to the target authenticator 405 from the target authentication server 404, the primitives defined in Table 4 and Table 5 may not be used unlike FIG. 3. Hereinafter, a description of different parts from FIG. 4 will be mainly given according to each step of FIG. 4.

(1)-(4) The multi-mode mobile node 401 can obtain, as in steps (1) to (4) in FIG. 3, information about at least one candidate access network from an information server 406 through MIH information request/response primitives while communicating with the current link 402. If a signal level received from the current link 402 is less than a prescribed threshold value (e.g., a threshold value higher than a value used to determine handover initiation), a higher layer of the mobile node 401 may command an MIH to initiate a pre-authentication procedure, and the pre-authentication procedure may be performed using the MIH_MN_Preauth.Request primitive as described in conjunction with FIG. 3.

(5) The MIH of the mobile node 401 receiving the MIH_MN_Preauth.Request primitive generates and transmits an MIH_MN_Preauth.Request primitive of an MIH remote protocol message to the MIH of the IEEE 802.16 network authenticator 405 of a target link. Unlike FIG. 3, it is assumed that the MIH_MN_Preauth.Request primitive is transmitted to the MIH of the target authenticator 405 from the MIH of the mobile node 401 without intervening the serving authenticator 402 and serving authentication server 403. Namely, the serving link serves to simply relay between the mobile node 401 and the target authenticator 405.

The MIH_MN_Preauth.Request primitive may include parameters within the primitive received in step (4).

(6) Next, the MIH of the target authenticator 405 generates and transmits, to an MIH user of the target authenticator 405, an MIH pre-authentication indication primitive such as the MIH_MN_Preauth.Indication illustrated in Table 2 in order to inform the MIH user of the authenticator 405 of a received result of the remote protocol message. The MIH pre-authentication indication primitive may include, as illustrated in Table 2, an identifier of the current link 402, an identifier of the current authentication server 403, an identifier of the target link 405, an identifier of the target authentication server 404, an identifier of the multi-mode mobile node 401, and a pre-authentication request indicator. However, when the MIH primitive is directly transmitted to the target link without relation to the current link, the identifier of the current link 402 and the identifier of the current authentication server 403 may be omitted.

(7) A security entity of the authenticator 403 receiving the MIH_MN_Preauth.indication primitive transmits a pre-authentication request message to the AAA server 404 linked with the target 802-series network (step (7)).

(8) Next, the pre-authentication procedure is substantially the same as the pre-authentication procedure of FIG. 3 except that the procedure is implemented between the mobile node 401, the target authenticator 405, and the target authentication server 404 without intervening the current authenticator 402 and the current authentication server 403. Moreover, a pre-authentication result is transmitted not to the MIH user of the current authenticator in FIG. 3 but to the MIH user of the target authenticator 405.

(9) The target authentication server 404 generates and transmits a pre-authentication response message including the pre-authentication procedure result to the security entity of the target IEEE 802-series network authenticator 405.

(10) The MIH user of the target authenticator 405 receiving the pre-authentication procedure result and keying materials to be used in the target link generates and transmits an MIH pre-authentication response primitive, such as the MIH_MN_Preauth.Response primitive illustrated in Table 3 to the MIH of the authenticator 405.

(11) The MIH of the target authenticator 405 receiving the MIH_MN_preauth.Response primitive generates and transmits an MIH_MN_Preauth_Response primitive of a remote protocol message to the MIH of the serving authenticator 402. This message may include parameters within the MIH_MN_Preauth.Response primitive. The MIH of the serving authenticator 402 receives the remote MIH_MN_Preauth.Response message and transmits the message to the MIH of the mobile node 401.

(12)-(15) The MIH of the multi-mode mobile node 401 receiving the MIH_MN_Preauth.Response primitive generates and transmits an MIH pre-authentication confirmation primitive such as the MIH_MN_Preauth.Confirmation illustrated in Table 3 to the MIH user. After the pre-authentication procedure is completed, a command for handover with a new network, that is, initiation of a link action procedure is transmitted from a higher management entity. In this case, the higher management entity informs that a security related procedure, which entails substantial load such as new authentication and key setting may lead to a delay, may be omitted. Therefore, the mobile node 401 can easily perform a handover procedure.

The above-described embodiment shows a scenario when the multi-mode mobile node served in the IEEE 802.16 network transmits a pre-authentication request through an authenticator of a target link and performs handover to the 802-series network. However, steps (10) to (12) may be omitted for an optimal procedure.

The above two embodiments described in conjunction with FIG. 3 and FIG. 4 provide handover between access networks when the mobile node uses an EAP-based authentication framework. However, the pre-authentication method and the handover method using the pre-authentication method according to the present invention may be identically applied to handover to a non-IEEE 802-series network which does not use the EAP-based authentication framework, that is, to a 3GPP network.

Figure 6:
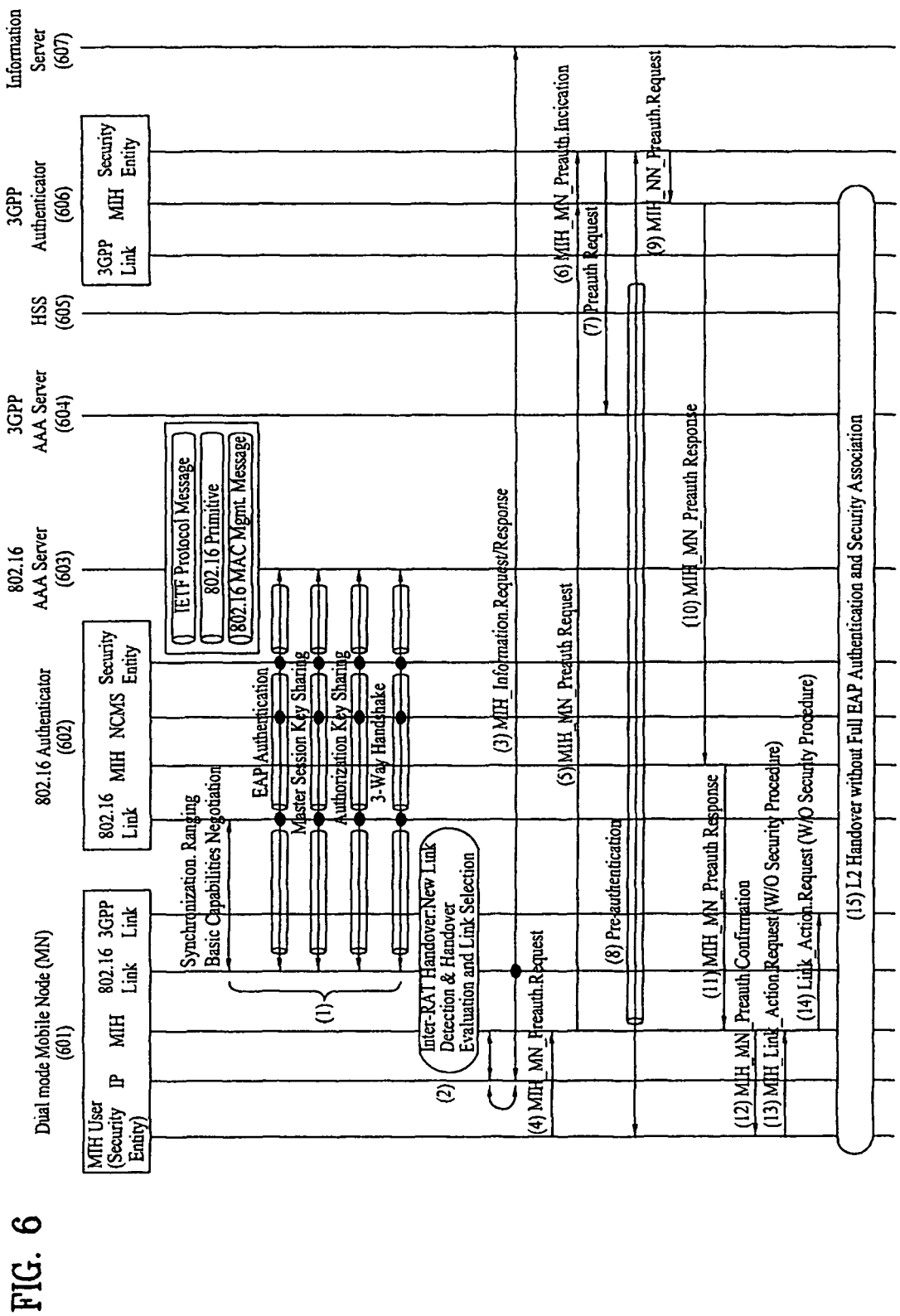

FIG. 5 and FIG. 6 illustrate processes of performing pre-authentication when a mobile node performs handover to a 3GPP network from an IEEE 802-series network according to a further exemplary embodiment of the present invention.

The exemplary embodiments of FIG. 5 and FIG. 6 show processes of performing a pre-authentication procedure when a mobile node performs handover from an IEEE 802.16 network to a non-IEEE 802-series network such as a 3GPP network. Namely, pre-authentication is implemented through an authentication method such as EAP-AKA or SIM, when a 3GPP AAA server 504 or 604 is present for interworking and an EAP-based authentication framework is supported.

A basic pre-authentication method and a handover method using the pre-authentication method are the same as the methods in FIG. 3 and FIG. 4. Therefore, although the embodiments of FIG. 5 and FIG. 6 will be explained step by step, a description of different parts from the embodiments of FIG. 3 and FIG. 4 will be focused upon.

In FIG. 5, a mobile node 501 requests a target link 506 to perform pre-authentication through a current link 502 as in FIG. 3.

The multi-mode mobile node 501 accesses an IEEE 802.16 network to perform EAP-based authentication (step (1)) and detects one or more candidate networks while maintaining connection with the IEEE 802.16 network 502 (step (2)). Thereafter, the mobile node 501 selects a target link as in the above embodiments and obtains information about the target link through MIH information request/response primitives from an information server 507 (step (3)). It is assumed that a non-802-series network operated by a different administrative domain through those primitives is a target link of handover. Specifically, in FIG. 5, a 3GPP network 506 of a non-802-series network is selected as a target link.

Meanwhile, if the multi-mode mobile node 501 recognizes that a signal level received from the IEEE 802.16 network is lower than a prescribed level (e.g., above a level for determining handover initiation), an MIH user of the mobile node 501 requests an MIH of the mobile node 501 to transmit a pre-authentication procedure request to a non-802-series network authentication server 504 of a target link through an MIH_MN_Preauth.Request primitive (step (4)). The pre-authentication procedure request may be transmitted to the non-802-series network authentication server 504 of a target link through the 802.16 network authenticator 502 and the authentication server 503. It is also assumed in this embodiment that the AAA server 503 including an EAP function does not support MIH as in the embodiments of FIG. 3 and FIG. 4.

The mobile node 501 receiving the MIH_MN_Preauth.Request primitive transmits corresponding information via an MIH and an MIH user of the IEEE 802.16 network authenticator 502 of a serving link (steps (5) and (6)) to the 3GPP AAA server 504 of a target link (step (7)). An example of primitives used in each step is illustrated in FIG. 5.

If the target authentication server 504 receives pre-authentication request information, a pre-authentication procedure is performed (step (8)). A home subscriber server (HSS), as well as the mobile node 501, the serving authenticator 502, the serving authentication server 503, the target authentication server 504 and the target authenticator 506, is associated with the pre-authentication procedure. A result of the pre-authentication procedure is transmitted to a security entity of the serving authenticator 502 (step (9)). The pre-authentication procedure including the 3GPP network authentication server 504 assumes inclusion of a procedure for extracting security contexts related to a user from the HSS.

Steps (10) to (21) may be identically performed with steps (10) to (21) in FIG. 3. However, it is assumed that MIH pre-authentication result transfer request/response primitives including information about the pre-authentication result include HSS identifier information related to pre-authentication, unlike the embodiment of FIG. 3 in which the HSS identifier information is omitted. Steps (16) to (18) may be omitted for an optimal procedure.

It is possible to selectively use the primitives such as MIH_MN_Preauth.Request/Indication primitives and MIH_MN_Preauth.Response/Confirmation.

Thus, since the pre-authentication is performed before substantial layer-2 handover is performed, a delay due to authentication in a process of Inter-RAT handover is reduced.

Meanwhile, In FIG. 6, a mobile node 601 directly requests a target network 606 to perform pre-authentication irrespective of relation to a current link 602 as in FIG. 4.

The multi-mode mobile node 601 accesses the IEEE 802.16 network 602 of a current serving link to perform EAP-based authentication (step (1)) and detects one or more candidate networks while maintaining connection with the IEEE 802.16 network 602 (step (2)). Thereafter, the mobile node 601 selects a target link as in the above embodiments and obtains information about the target link through MIH_Information.Request/Response primitives from an information server 607 (step (3)). It is assumed that a non-802-series network operated by a different administrative domain through those primitives is a target link of handover. Specifically, in FIG. 6, the 3GPP network 606 of a non-802-series network is selected as a target link.

Meanwhile, if the multi-mode mobile node 601 recognizes that a signal level received from the IEEE 802.16 network is lower than a prescribed level (e.g., above a level for determining handover initiation), an MIH user of the mobile node 601 request an MIH of the mobile node 601 to transmit a pre-authentication procedure request to a non-802-series network authentication server 604 of a target link through an MIH_MN_Preauth.Request primitive (step (4)). While the pre-authentication request is transmitted to the non-802-series network authentication server 604 of a target link by relation to the pre-authentication procedure of the 802.16 network authenticator 602 and the authentication server 603 in the embodiment of FIG. 5, the pre-authentication request is transmitted to the target authenticator 606 through simple relay of the 802.16 network authenticator 602 and the authentication server 603 in the embodiment of FIG. 6 (steps (5) and (6)). Moreover, in this embodiment, a transmitted MIH_MN_Preauth.Indication primitive may additionally include parameters (for example, HSS identifier) necessary for an MIH user.

A security entity of the authenticator 606 receiving the MIH_MN_Preauth.Indication primitive transmits a pre-authentication request message to the AAA server 604 linked with the target 3GPP network.

A pre-authentication procedure is performed between the mobile node 601 and the target AAA server 604 through an IETF protocol (step (8)). The mobile node 601, the target authenticator 606, the target authentication server 604, and a target HSS 605 may be associated with the pre-authentication procedure. A result of the pre-authentication procedure may be transmitted to an MIH user of the target authenticator 606. The pre-authentication procedure including the authentication server 604 of the 3GPP network includes a procedure for extracting security contexts related to a user from the HSS 605.

Steps (9) to (16) may be identically performed with the embodiment of FIG. 4. However, it is assumed that MIH pre-authentication response primitives which transmit the pre-authentication result may include an identifier of an HSS 605 unlike the embodiment of FIG. 4.

Meanwhile, steps (9) to (13) may be omitted for an optimal procedure.

As described above, since the pre-authentication procedure is performed prior to handover, a delay due to authentication during an actual handover process can be decreased.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The invention claimed is:

1. A method of performing, by a multi-mode mobile station (MS), handover between heterogeneous radio access networks, the method comprising:
   acquiring information about candidate target access networks as well as a current access network connected to the multi-mode MS;
   determining a network type of each of candidate target access networks;
   transmitting a pre-authentication request message to each of the candidate target access networks, when a signal level received from the current access network is lower than a first threshold value;
   receiving pre-authentication result information in response to the pre-authentication request message from each of the candidate target access networks; and
   performing handover to a selected target access network using the pre-authentication result information without any additional authentication process, when a signal level received from the current access network is lower than a second threshold value, wherein the first threshold value is set to higher than the second threshold value,
   wherein the pre-authentication result information includes security information for the multi-mode MS extracted from a home subscriber server (HSS) in case of a first type target network, and the pre-authentication result information omits the security information for the multi-mode MS extracted from the HSS in case of a second type target network.

2. The method of claim 1, wherein at least one of the acquiring information, transmitting a pre-authentication request message, receiving pre-authentication result information, and performing handover is performed using a media independent handover (MIH) primitive.

3. The method of claim 2, wherein the transmitting a pre-authentication request message is performed using an MIH pre-authentication request primitive, and wherein the MIH pre-authentication request primitive includes at least one of an identifier (ID) of the current access network, an ID of an authentication server of the current access network, an ID of the selected target access network, an ID of an authentication server of the selected target access network, an ID of the multi-mode MS, and a pre-authentication request indicator.

4. The method of claim 2, wherein the receiving pre-authentication result information is performed using an MIH pre-authentication response primitive, and wherein the MIH pre-uthentication response primitive includes at least one of an ID of the current access network, an ID of an authentication server of the current access network, an ID of the selected target access network, an ID of an authentication server of the selected target access network, an ID of a home subscriber server (HSS) of the selected target access network, a pre-authentication result status ID, and a pre-authentication result transfer status ID.

5. The method of claim 1, wherein the pre-authentication request message and the pre-authentication result information are respectively transmitted and received via the current access network if the transmitting and receiving are indirectly performed.

6. The method of claim 1, wherein the pre-authentication request message and the pre-authentication result information are respectively transmitted and received by an MIH entity of the multi-mode MS, and further comprising:

receiving, by the MIH entity of the multi-mode MS, the pre-authentication request message from an MIH user entity of the multi-mode MS, before the MIH entity transmits the pre-authentication request message; and notifying, by the MIH entity, the MIH user entity of the pre-authentication result information, after the MIH entity receives the pre-authentication result information.

7. The method of claim 6, wherein the notifying the MIH user entity of the pre-authentication result information is performed using an MIH pre-authentication confirmation primitive, and wherein the MIH pre-authentication confirmation primitive includes at least one of an ID of the current access network, an ID of an authentication server of the current access network, an ID of the selected target access network, an ID of an authentication server of the selected target access network, a pre-authentication result status ID, and a pre-authentication result transfer status ID.

8. The method of claim 1, wherein the first type target network does not use EAP (Extensible Authentication Protocol) as a basic authentication framework and supports EAP-SIM (Subscriber Identity Module) or EAP-AKA (Authentication and Key Agreement), and the second type target network uses EAP as a basic authentication framework.

* * * * *